United States Patent Office 3,245,676
Patented Apr. 12, 1966

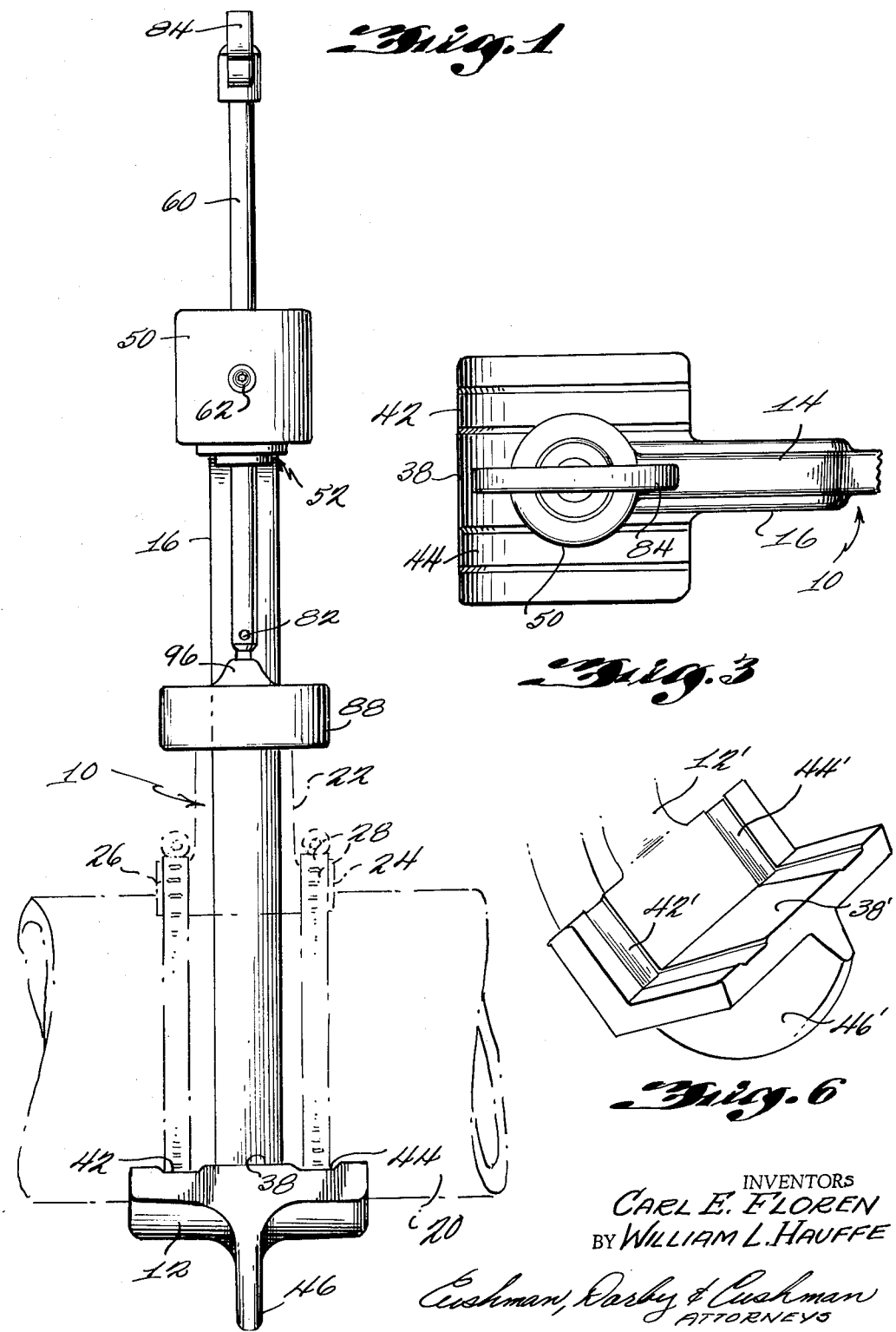

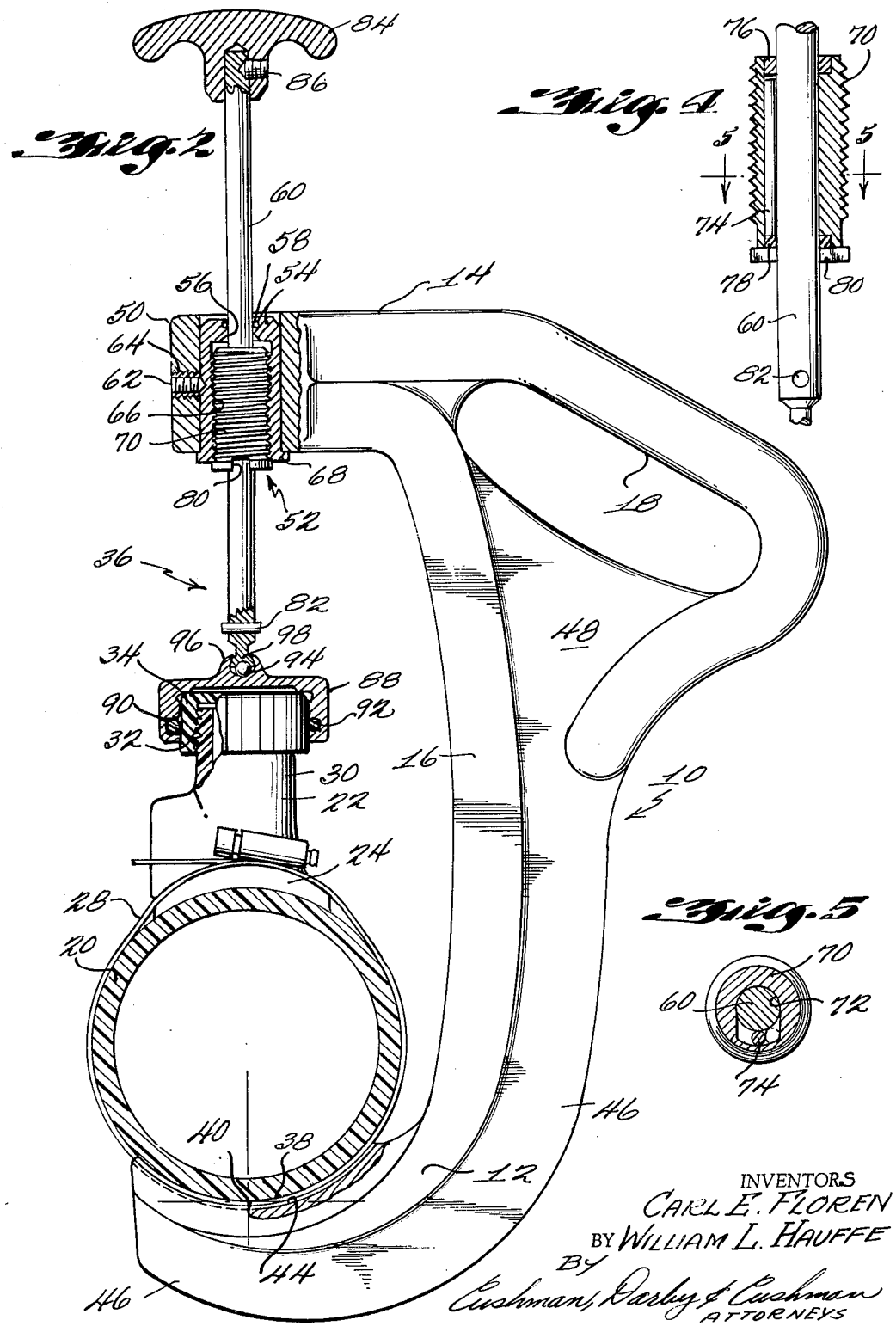

3,245,676
QUICK ACTING PLASTIC SERVICE T CLAMP
Carl E. Floren and William L. Hauffe, Decatur, Ill., assignors to Mueller Co., Decatur, Ill., a corporation of Illinois
Filed Jan. 17, 1963, Ser. No. 252,085
7 Claims. (Cl. 269—165)

The present invention has reference to an installation clamp adapted for assembly of a plastic pipe T to plastic pipe by solvent welding, and to a new and improved method of joining a plastic pipe T to plastic pipe.

According to the present invention, a quick-acting clamp for installing a plastic service T to a plastic pipe is provided which is characterized by an ability to accommodate plastic pipe through a generous range of sizes, the clamp being quick-acting and provided with a clutch mechanism such that a force can be applied to the pipe T in order to effectively solvent weld the same to the plastic pipe.

The installation clamp according to this invention includes a C-clamp defined by opposed legs and an elongated transition member with an integrally formed handle adjacent one of the legs. The opposite leg has an arcuate jaw surface so as to receive various sizes of plastic pipe, the configuration of this leg including longitudinally spaced arcuate recesses for receiving holding bands which are adapted for endwise movement through the recesses to join the service T to the pipe. The opposite leg carries a clamp assembly the axis of which passes through a perpendicular tangent line of the opposite arcuate surface, so that the line of force of the clamp member is in the centerline of any pipe assembled to the C-clamp. Alternatively, a V-shaped jaw recess may be utilized to receive the plastic pipe in the manner described. The clamping assembly carries a cup-shaped member connected for limited universal movement relative thereto, this member having an O-ring therein and adapted to carry a completion or pipe cap, which cap, in turn, is threaded to a throughbore end of the plastic T. A clutch mechanism is provided for carrying the clamping member so that the assembly is characterized by quick action and simple, reliable, and trouble-free use in the field. Still further, the entire C-clamp and handle is preferably of unitary one-piece construction with the handle angularly disposed relative to the leg opposite the arcuate jaw surface and the transition member so that the entire assembly is easily manipulated by one workman, e.g., in installing gas and water service mains.

According to the method of the present invention a new and improved procedure for solvent welding a plastic service T to a plastic pipe is provided. To this end, one throughbore end of the service T carries a threaded cap. This assembly is carried as a unit by a holding cup; force is exerted on the holding cup to press the T against the pipe after solvent is applied to the mating surfaces. While in this condition, holding bands are slipped endwise about the pipe and a saddle on the service T and the elements are clamped together. The force on the holding cup is then released and a workman can then leave this region for other duties while the elements are secured together and the solvent sets.

These and still further objects, advantages, and novel features of the invention will become apparent in the specification and claims, taken in conjunction with the accompanying drawings.

In the drawings:
FIGURE 1 is a front elevation view of the installation clamp according to this invention;
FIGURE 2 is a side elevation view of the clamp in FIGURE 1;
FIGURE 3 is a plan view of the installation clamp;
FIGURE 4 is an enlarged detail section view of the clutch assembly;
FIGURE 5 is a view taken along line 5—5 in FIGURE 4, showing the clutch assembly in its locked and unlocked positions; and
FIGURE 6 is a partial perspective view of a modified embodiment of the installation clamp according to this invention.

Referring now to the accompanying drawings there is shown an installation clamp according to this invention which generally includes a C-clamp 10 having opposed legs 12 and 14 joined by an integral transition member 16 of elongated construction. A handle 18 in the form of an elongated slotted aperture is provided, the axis of which is angularly disposed between the axis of the leg 12 and the transition part 16, the entire C-clamp being of integrally formed, unitary construction.

The leg 12 constitutes a jaw adapted to receive a plastic pipe 20 having a plastic service T 22 joined to its upper surface in extending relationship towards the leg 14. To this end, the plastic service T 22 includes a saddle portion 24 adjacent the lower end of the throughbore. As will be explained these elements carry spaced apart hose bands 26 and 28 on opposite sides of the saddle portion 24. The opposite and upper end of the T throughbore 30 is exteriorly threaded at its free end 32 and carries a cap 34 in threaded engagement therewith.

The leg 14 carries a quick-acting clamp assembly 36 which extends axially towards the leg 12 and is adapted to retain the service T 22 by engagement with its upper throughbore end 30 via the cap 34, as will be explained.

The leg 12 has a concave curved arcuate surface 38 which has a tangent line intersecting the axis of the clamp assembly 36 in perpendicular relationship at 40 so that the force which is imparted by the clamp assembly 36 is along a line stably positioning the pipe 20 in the assembly (FIGURE 2).

In order to accommodate the hose bands 26, 28 the arcuate surface 38 has cooperatively positioned, longitudinally spaced apart arcuate recesses 42, 44 which receive the hose bands so that there is a substantial bearing surface for the pipe on the arcuate surface 38. The C-clamp 10 is reinforced along its exterior periphery by a central web 46 which merges in an enlarged portion 48 at the region of the handle 18.

The opposite leg 14 carries a boss 50 having an axis coincident with the clamping assembly 36. The boss 50 carries a one-way clutch 52 which is, in itself, known in the art as typified by the patents to Richards No. 2,313,361 and Burbank et al. No. 2,396,823. To this end, the clutch 52 comprises a bushing 54 having a bore 56 carrying an O-ring 58, the bore receiving a pressure rod 60 therethrough. The bushing 54 is retained in axially fixed, non-rotatable relationship within the boss 50 by an Allen head machine screw 62 received in a threaded insert 64, which elements are mounted in transverse relationship in the boss 50. The screw 62 thereby engages a cooperatively positioned recess in the bushing 54.

The bushing 54 has an interiorly threaded counterbore 66 merging with a flange 68 at its lower end which abuts the adjacent surface of the boss 50.

The pressure rod 60 carries a clutch sleeve 70, exteriorly threaded, and having a transversely elongated, longitudinally extending slot 72 which receives the pressure rod 60 at its curved central base. The remaining space in the slot 72 adjacent the pressure rod 60 carries an axially extending locking roller 74 as shown in the Burbank et al. Patent No. 2,396,823. Retaining washers 76, 78 are carried in the opposed ends of the clutch sleeve 70. The clutch sleeve 70 is thereby longitudinally movable relative to the pressure rod 60 but its exterior threads are adapted for engagement with the interiorly threaded counterbore 66 in the bushing 54. To this end, the clutch sleeve 70 has a longitudinally slotted recess 80 in its flanged lower end, and the pressure rod 60 carries a cooperatively-arranged transverse threading pin 82 adjacent its bottom end so that the rod can be lifted up through the boss 50, and the pin 82 engages the clutch sleeve recess 80. The clutch sleeve 70 may thereby be threaded into the bushing 54. The pressure rod 60 carries a handle 84 at its uppermost end as by a retaining screw 86.

The lower end of the pressure rod 60 carries a holding cup 88 which faces downwardly and is of a size to receive the cap 34 which is threaded onto the lateral outlet through bore 30 of the service T. The cup has an interior annular recess 90 which carries an O-ring 92, and the holding cup is universally connected to the bottom end of the pressure rod 60 via a ball bearing 94 between the two elements. This arrangment allows relative rotation of the rod 60 with respect to the holding cup 88 for reasons to become evident. The holding cup 88 has an inwardly rolled or peened retaining boss 96 which surrounds the lower flared end 98 of the pressure rod 60, the latter element engaging the upper part of the ball bearing 94. This provides a swivel connection between the holding cup 88 and the pressure rod 60.

The method and procedure for completing a solvent weld joint bewteen the pipe 20 and the T 22 is as follows:

The retaining rod 60 is initially turned counterclockwise until the clutch sleeve 70 is threaded securely into the bushing 54. At this point the rod 60 may appear to bind, but the handle is turned another 90° or so, which moves the locking roller 74 to its unlocked position and the rod 60 is then free to slide relative to the clutch sleeve 70 and the bushing 54 in the boss 50. Should the shaft begin to turn freely before the clutch sleeve 70 is in secure engagement with the bushing 54, the rod 60 is simply raised with its threading pin 82 engaged with the clutch recess 80 and the rod 60 is rotated in a counterclockwise direction until the sleeve 70 is threaded into the bushing 54. The rod 60 can then be pushed down and, as described, rotated in a clockwise direction to lock the rod 60.

The plastic service T 22 with its cap 34 threaded onto its upper end 30 is inserted into the holding cup 88 so that the O-ring 92 snugly grips the peripheral surface of the cap 34. Solvent welding cement is applied to the plastic pipe 20 and to the bottom of the saddle portion 24 of the service T 22, and the C-clamp 10 is engaged with the plastic pipe 20 as described, the arcuate surface 38 providimg a substantial bearing surface for the pipe.

The rod 60 is then rotated counterclockwise so that the rod is slidable in the boss 50 and the service T 22 which is gripped by the holding cup 88 is properly positioned on the pipe. When so positioned, the rod 60 is then rotated clockwise and turning is continued in this direction until the solvent squeezes out of the T during this rotation. An incremental force is provided because the clutch sleeve 70 is being unthreaded and thereby moving towards the pipe. The hose bands 26, 28 are then installed by sliding their free ends completely through the spaced apart arcuate recesses 42 and 44 and the hose bands are then assembled and joined to the saddle portion 24 of the service T 22 in a conventional manner. After the bands have been tightened the pressure of the holding cup 88 is removed by rotating the rod 60 in a counterclockwise direction until the clutch sleeve 70 is threaded into the bushing 54 and the "binding point" is again passed. The rod 60 is thereby free to slide in the boss 50 and the operation is completed.

It will be appreciated that the instant invention has particular utility in the assembly of plastic pipe for gas and water service and the installation clamp is adapted to accommodate gas and water pipe of varying sizes, conveniently through a range of perhaps 1¼" through 4". While FIGURE 2 shows the arcuate surface 38 coextensive with the pipe 20, it will be appreciated that this arrangement can be varied as the pipe will always be stably retained at point 40, coincident with the axis of the clamping assembly 36. The workman in the field need not carry separate clamps for different size pipe, and production and operation in the field is greatly simplified. Moreover, the service T outlets can face in either direction and the method of assembly is such that the hose clamp can be installed after pressure is created between the service T and the pipe so that the clamp itself can be removed immediately for reuse at another installation. The O-ring carried in the holding cup constitutes a simple and efficient arrangement for temporarily gripping the threaded cap of the plastic pipe.

Referring now to FIGURE 6, there is shown a perspective view of the leg 12 carrying a V-shaped surface 38' adapted to receive the plastic pipe in a manner described. The surface 38' has longitudinally spaced apart recesses 42', 44' to accommodate the bands 26, 28. As will be evident, this modification operates in the same manner as the FIGURE 1–5 embodiment to position in an arcuate manner the plastic pipe for welding a T thereto.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the acompanying drawings are to be interpreted in an illustrative and not in a limiting sense.

What is claimed is:

1. Installation clamp for assembling a plastic service T to a plastic pipe or the like comprising: a C-clamp having opposed first and second legs and a transition member joined thereto, said C-clamp including a handle adjacent said first leg; said second leg having a symmetrical bearing surface formed by opposite inclined surfaces adapted to receive a pipe, said bearing surface including spaced apart transverse recesses thereacross whereby holding parts may be inserted endwise through said recesses about the pipe; said first leg carrying a clamping assembly including a pressure rod aligned in symmetrical relationship with said bearing surface; clutch means joined to said first leg and carrying said pressure rod and operative to accommodate axial sliding movement of said pressure rod in a clutch-disengaged position and in a pressure-transmitting relationship in a clutch-engaged position; a holding cup mounted in concentric relationship to the end of said pressure rod adjacent said first leg for limited universal movement relative thereto, said holding cup including means carried therein having a surface operative for removably gripping a T for pressure transmitting engagement towards a plastic pipe carried by said inclined bearing surface.

2. Installation clamp defined in claim 1 wherein said gripping means includes a resilient ring carried within said holding cup.

3. Installation clamp defined in claim 1 wherein said bearing surface is arcuate.

4. Installation clamp defined in claim 1 wherein said bearing surface is V-shaped.

5. Installation clamp for assembling a plastic service T to a plastic pipe or the like comprising: a C-clamp having opposed first and second legs and a transition member joined thereto, said C-clamp including a handle adjacent said first leg; said second leg having a symmetrical bearing surface formed by opposed inclined surfaces adapted to receive a pipe, said bearing surface including spaced apart transverse recesses thereacross whereby holding parts may be inserted endwise through said recesses about the pipe; said first leg including a boss carrying a clamp assembly including a pressure rod aligned in symmetrical relationship with said bearing surface; clutch means carried within said boss in threaded relationship and carrying said pressure rod and operative to accommodate axial sliding movement of said pressure rod in a clutch-disengaged position and in a pressure-transmitting relationship in a clutch-engaged position; a holding cup mounted in concentric relationship to the end of said pressure rod adjacent said second leg, said holding cup including means carried therein having a surface operative for removably gripping a service T for pressure transmitting engagement towards a plastic pipe carried by said bearing surface; transversly extending pin means carried by said retaining rod intermediate said holding cup and said first leg; and means carried by the end of said clutch means engageable with said pin means for threading said clutch means into said boss.

6. Installation clamp defined in claim 5 wherein said bearing surface is arcuate.

7. Installation clamp defined in claim 5 wherein said bearing surface is V-shaped.

References Cited by the Examiner

UNITED STATES PATENTS

| | | | |
|---|---|---|---|
| 14,550 | 4/1856 | Ball | 269—189 |
| 288,035 | 11/1884 | Dixon | 269—249 X |
| 941,832 | 11/1909 | Widman | 81—186 |
| 1,452,753 | 4/1923 | Otto et al. | 269—189 |
| 2,236,913 | 4/1941 | Merrill | 269—270 |
| 2,282,310 | 5/1942 | Dunn | 269—249 X |
| 2,383,230 | 8/1945 | Voke | 156—69 |
| 2,396,823 | 3/1946 | Burbank et al. | 269—249 X |
| 2,521,470 | 9/1950 | Matheson | 156—308 |
| 2,704,681 | 3/1955 | Fischer | 287—53 |
| 2,805,594 | 9/1957 | Fogel | 81—125 |
| 2,973,296 | 2/1961 | Weber | 156—71 |

FOREIGN PATENTS 229,246  1/1944  Switzerland.

WILLIAM W. DYER, Jr., *Primary Examiner.*

EARL M. BERGERT, ROBERT C. RIORDON,
*Examiners.*